(12) United States Patent
Holmes

(10) Patent No.: US 11,529,555 B2
(45) Date of Patent: *Dec. 20, 2022

(54) GAME SYSTEMS AND METHODS

(71) Applicant: Steven Thomas Holmes, Redwood City, CA (US)

(72) Inventor: Steven Thomas Holmes, Redwood City, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/235,851

(22) Filed: Apr. 20, 2021

(65) Prior Publication Data

US 2021/0275901 A1 Sep. 9, 2021

Related U.S. Application Data

(63) Continuation of application No. 16/446,024, filed on Jun. 19, 2019, now Pat. No. 11,007,423.

(60) Provisional application No. 62/687,591, filed on Jun. 20, 2018.

(51) Int. Cl.
*A63F 3/00* (2006.01)
*A63F 9/24* (2006.01)

(52) U.S. Cl.
CPC ............ *A63F 3/00643* (2013.01); *A63F 9/24* (2013.01); *A63F 2003/00662* (2013.01); *A63F 2009/2442* (2013.01); *A63F 2300/6045* (2013.01); *A63H 2200/00* (2013.01)

(58) Field of Classification Search
USPC .......................................................... 273/12
See application file for complete search history.

(56) References Cited

U.S. PATENT DOCUMENTS

| | | | |
|---|---|---|---|
| 8,880,606 B2* | 11/2014 | Aldunate | H04L 67/75 709/204 |
| 2011/0066682 A1* | 3/2011 | Aldunate | H04L 67/75 709/204 |
| 2012/0327112 A1* | 12/2012 | Aldunate | H04L 67/131 345/629 |
| 2017/0120148 A1* | 5/2017 | Yim | A63F 13/65 |
| 2017/0216728 A1* | 8/2017 | Logan | A63F 13/213 |

* cited by examiner

*Primary Examiner* — Pierre E Elisca
(74) *Attorney, Agent, or Firm* — David R. Stevens; Stevens Law Group

(57) ABSTRACT

Example game systems and methods are described. In one implementation, a sensing device determines an identity of a game piece in a physical space and detects a movement action associated with the game piece. A computing device calculates a distance and direction associated with the movement action and determines a result of the movement action based on the distance, the direction, and the identity of the game piece.

20 Claims, 15 Drawing Sheets

GAME SYSTEMS AND METHODS

CROSS REFERENCE TO RELATED APPLICATIONS

This application is a continuation of U.S. application Ser. No. 16/446,024, entitled "Game Systems And Methods," filed Jun. 19, 2019, which in turn claims the benefit of U.S. Provisional Application Ser. No. 62/687,591, entitled "Game Mechanics," filed Jun. 20, 2018, the disclosure of which is incorporated herein by reference in its entirety.

TECHNICAL FIELD

The present disclosure relates to systems and methods for use with various types of games and gaming environments.

BACKGROUND

Many physical games are played on a simulated battlefield or other simulated environment. These physical games are often played with physical game pieces that represent different creatures, people, weapons, vehicles, objects, and the like. The particular types of game pieces used in a specific game will vary based on the type of game. For example, a military battle game may include game pieces that represent soldiers, military weapons, military vehicles, and so forth.

In many situations, the game pieces have different attributes that represent characteristics of the game piece, such as fighting capabilities, strengths, weaknesses, and the like. When two or more game pieces engage one another (e.g., battle each other), the result of the engagement is based on multiple factors, such as the characteristics of each game piece, the locations of the game pieces with respect to each other, the current game situation, and so forth.

These types of physical games may be time-consuming due to the complex rules and detailed calculations necessary to determine the results of each engagement of two or more game pieces. In some situations, it is necessary to measure distances between game pieces, angles of attack between game pieces, obstacles and other intervening terrain, and other physical characteristics, then apply that information to the engagement rules and engagement algorithms that determine the results of each engagement. These measurements and calculations can take considerable time and slow the overall progress of the game.

Accordingly, what is needed is an improved approach for game play.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

Figure 1:
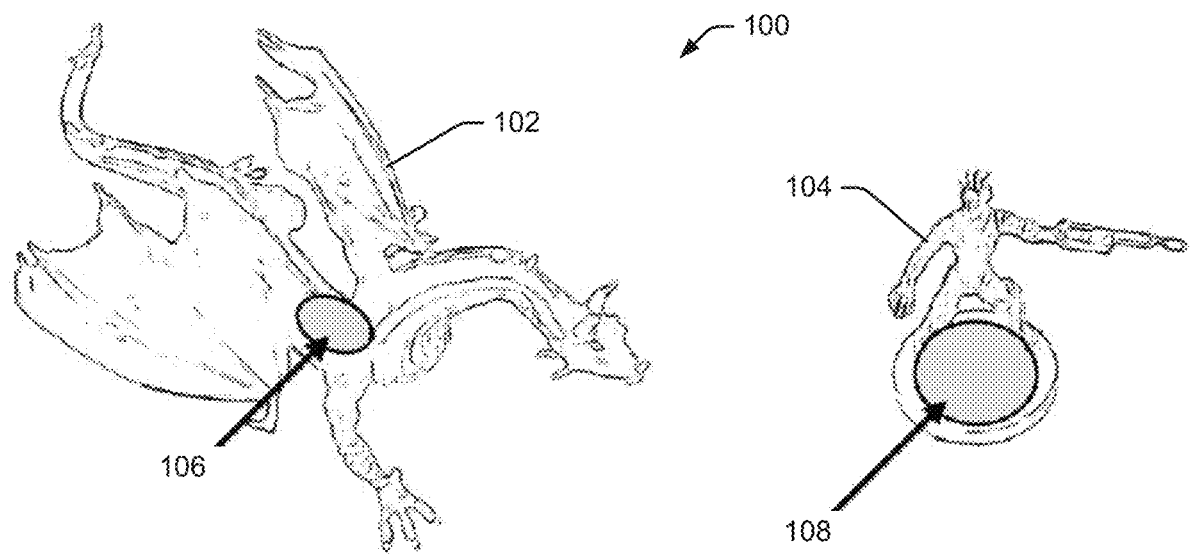
FIG. 1 illustrates an embodiment of a gaming environment with two game pieces.

In the following disclosure, reference is made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter is described in language specific to structural features and/or methodological acts, it is to be understood that the subject matter defined in the appended claims is not necessarily limited to the described features or acts described herein. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

At least some embodiments of the disclosure are directed to computer program products comprising such logic (e.g., in the form of software) stored on any computer useable medium. Such software, when executed in one or more data processing devices, causes a device to operate as described herein.

The systems and methods described herein support playing a game with two or more physical game pieces in a physical space (or physical environment). In particular, each game piece can be identified by a sensing device, such as a mobile computing device, a camera, an RFID (Radio-Frequency Identification) sensor, a Bluetooth low energy beacon, an IMU (Inertial Measurement Unit), and the like. In some embodiments, each game piece has an associated identification mechanism, such as an RFID tag, a visual code (e.g., a bar code or QR (Quick Response) code), distinct visual references recognized using computer vision, distinct colors, visual patterns, IR identifiers, light wavelengths, pulsed light patterns, a unique Bluetooth beacon or other identifier. For example, a sensing device can sense (or read) the RFID or visual code to identify the type of game piece. As described herein, the game piece identity is used to determine the game piece's characteristics, movement and game play options for that game piece, and used to determine the results of an engagement of the identified game piece with another game piece (or multiple other game pieces) in the physical space. An engagement between two game pieces may also be referred to as an interaction between the two game pieces.

In particular embodiments, a first user identifies a first game piece using a first sensing device and a second user identifies a second game piece using a second sensing device. The two sensing devices can also determine the location of their respective game pieces within the physical space. Based on the identity and location of each game piece, either of the sensing devices (or another computing system) can calculate the results of an engagement between the two game pieces.

FIG. 1 illustrates an embodiment of a gaming environment 100 with two game pieces. A first game piece 102 represents a dragon or other character in a game that is played in gaming environment 100. A second game piece 104 represents a fighter or other character in the game that is played in gaming environment 100. Game pieces 102 and 104 are physical game pieces that can be handled, moved, and positioned by one or more users, such as players in the game. Game piece 102 has an identification mechanism 106, such as an RFID tag, a visual code, or other identifier. Game piece 104 also has an identification mechanism 108, such as an RFID tag, a visual code, or other identifier. In some embodiments, identification mechanisms 106 and 108 may be embedded within game pieces 102 and 104, respectively. For example, RFID tags may be embedded within a game piece. Alternatively, one or both of identification mechanisms 106 and 108 may be positioned on an outer surface of game pieces 102, 104. For example, visual codes may be printed on a game piece or printed on a substrate (or other material) that is attached to the game piece.

As discussed herein, identification mechanisms 106 and 108 can be read (or sensed) by sensing device, such as a mobile computing device, a camera, an RFID sensor, an IMU, or other device. In some embodiments, identification mechanisms 106 and 108 are the same type of mechanism (e.g., both are RFID tags or both are visual codes). In other embodiments, identification mechanisms 106 and 108 are different types of mechanisms (e.g., one is an RFID tag and the other is a visual code).

Figure 2:
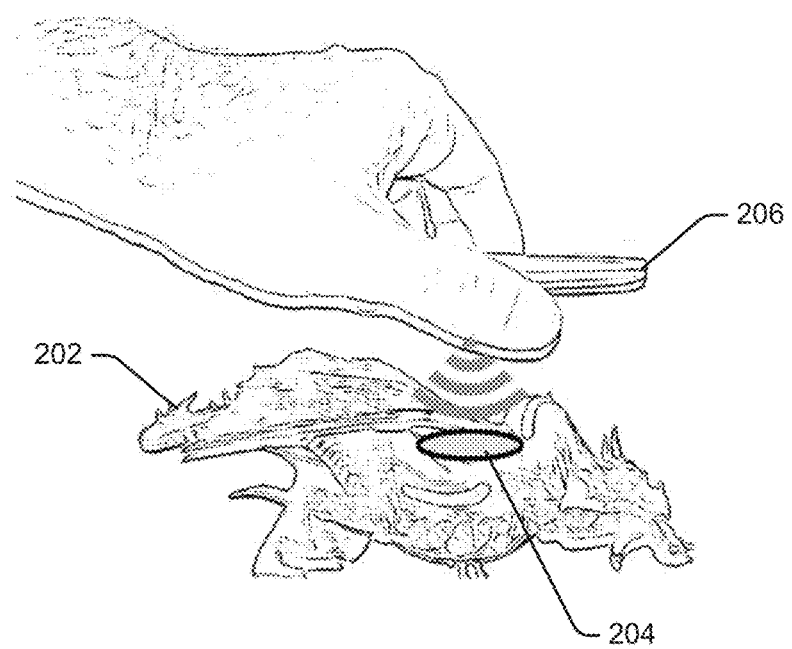
FIG. 2 illustrates an embodiment of a sensing device determining an identity of a particular game piece.

FIG. 2 illustrates an embodiment of a sensing device that is determining an identity of a particular game piece. In the example of FIG. 2, a sensing device 206 is positioned close to a game piece 202 by a user (e.g., a player of a game using game piece 202). For example, when sensing device 206 is positioned close to game piece 202, sensing device 206 reads (or senses) an identity associated with an identification mechanism 204. In a particular implementation, a user may move sensing device 206 near game piece 202 such that sensing device 206 automatically identifies the game piece type (e.g., a dragon or a fighter) by receiving the RFID value or determining the value identified by the visual code.

Figure 3:
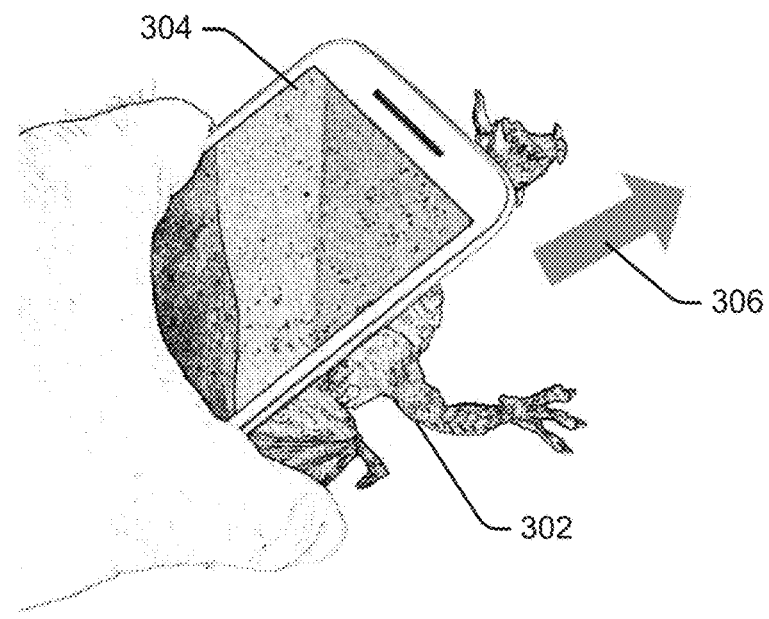
FIG. 3 illustrates an embodiment of a movement action associated with a game piece and simulated by moving the sensing device.

FIG. 3 illustrates an embodiment of a movement action associated with a game piece and simulated by moving the sensing device. As shown in FIG. 3, a game piece 302 can be moved simultaneously with a sensing device 304. For example, a user may grip (or grasp) game piece 302 and sensing device 304 at the same time using one or more of their hands. Game piece 302 and sensing device 304 are moved together in a direction indicated by an arrow 306. As discussed herein, sensing device 304 senses the identity of game piece 302. Additionally, sensing device 304 may sense the distance and direction of movement of game piece 302 based on the movement of sensing device 304.

Figure 4:
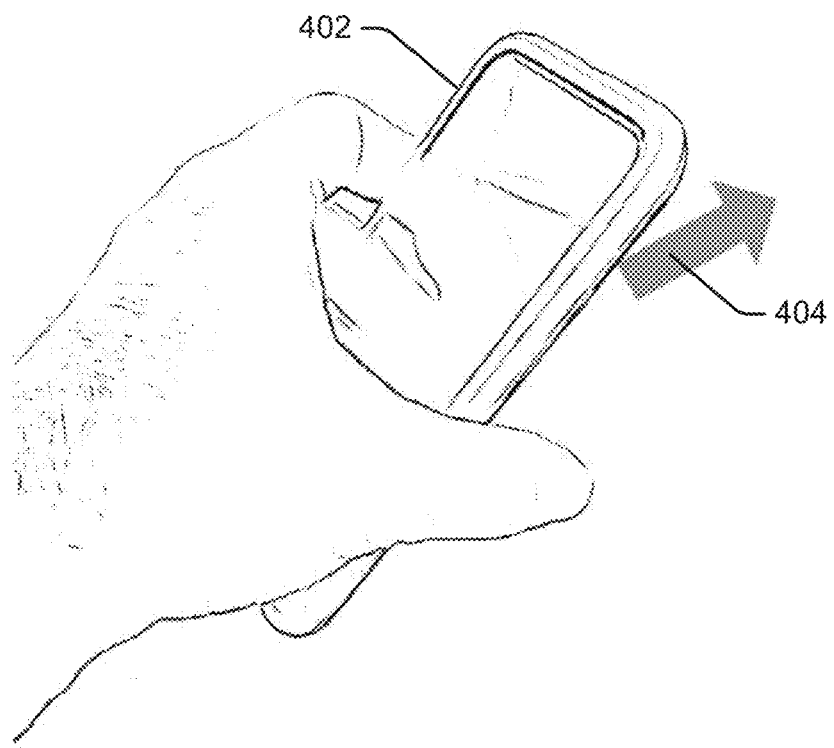
FIG. 4 illustrates an embodiment of simulating a movement action with a sensing device.

FIG. 4 illustrates an embodiment of simulating a movement action with a sensing device. In the example of FIG. 4, a sensing device 402 is moved in a direction indicated by an arrow 404. In this situation, the movement of sensing device 402 simulates movement of a game piece within the game environment. Thus, a user can grip sensing device 402 and move it in the desired direction and distance of movement of the physical game piece, but the user is not required to grip or move the physical game piece.

Figure 5:
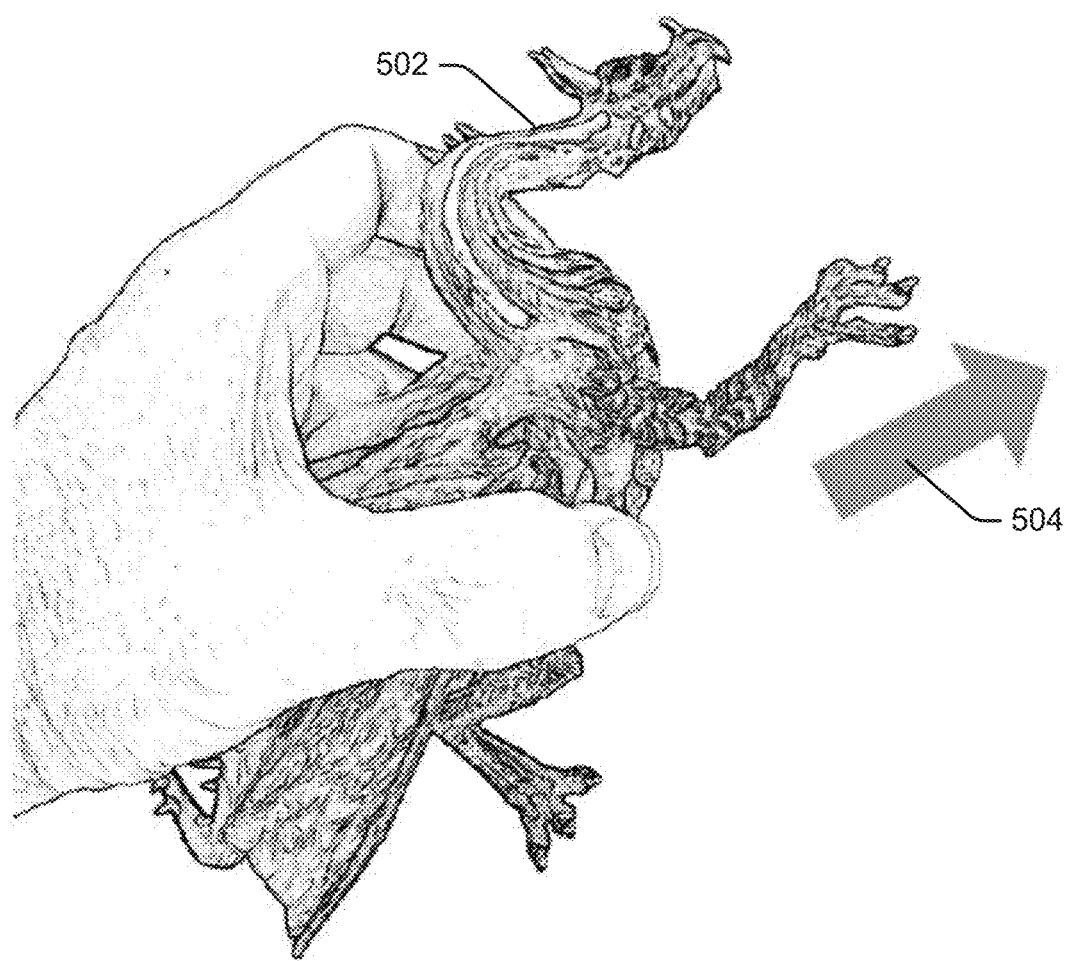
FIG. 5 illustrates an embodiment of a physical movement of a game piece in a gaming environment.

FIG. 5 illustrates an embodiment of a physical movement of a game piece in a gaming environment. The example of FIG. 5 represents physically moving a game piece 502 after the movement has been simulated by sensing device 402 as described with respect to FIG. 4. In this situation, game piece 502 is moved to the destination position as simulated by sensing device 402 by moving game piece 502 as indicated by an arrow 504.

Figure 6:
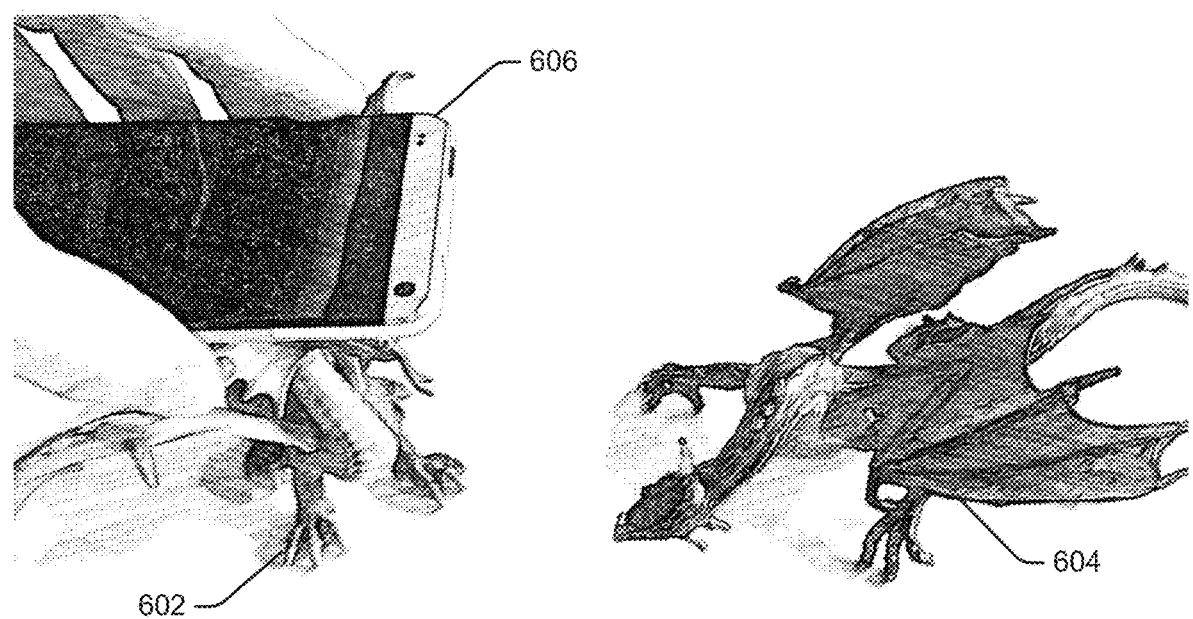
FIGS. 6-8 illustrate an embodiment of a first game piece engaging with a second game piece.
Figure 7:
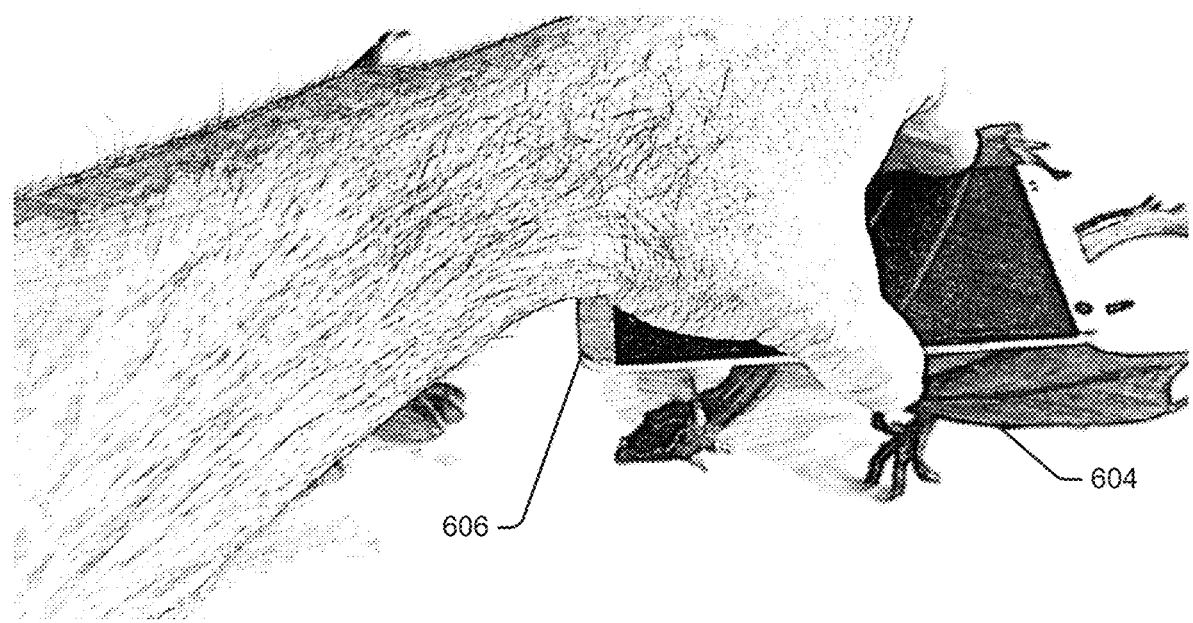
Figure 8:
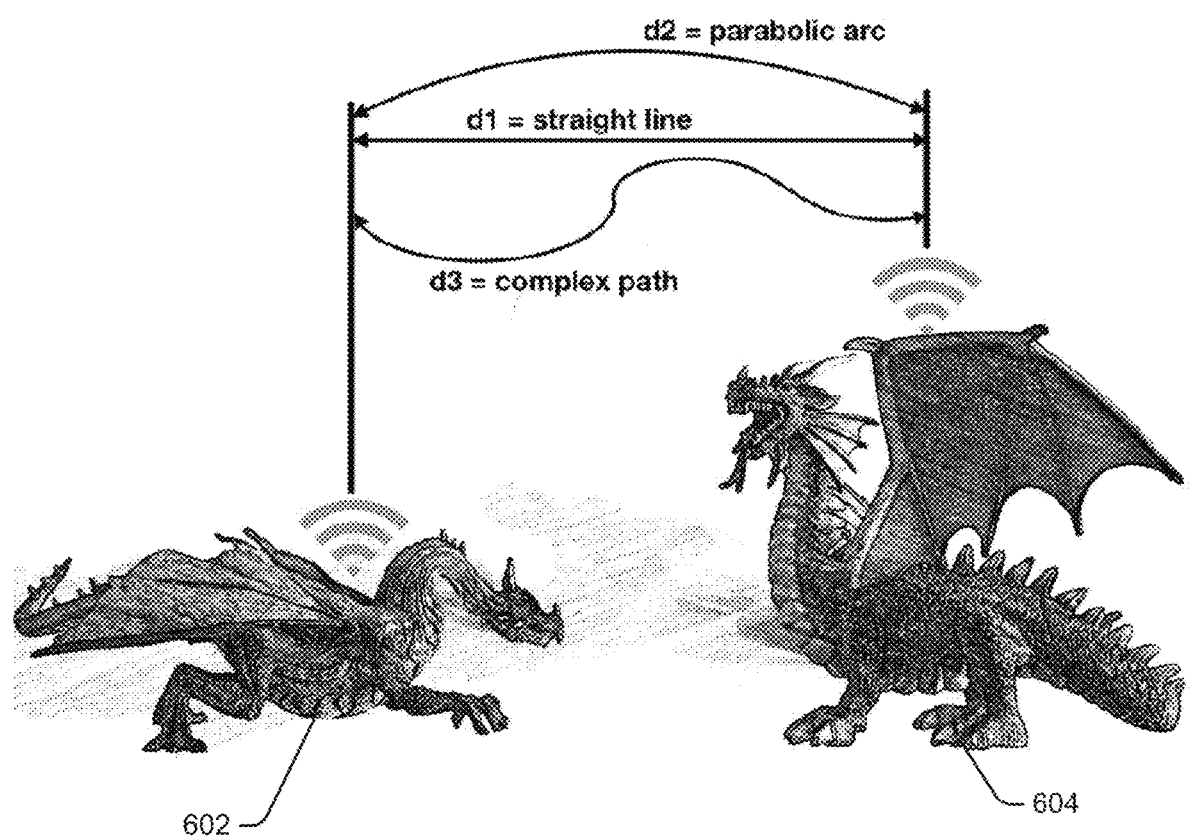

FIGS. 6-8 illustrate an embodiment of a first game piece engaging with a second game piece. In the example of FIG. 6, a first game piece 602 is initiating an engagement (or interaction) with a second game piece 604. A sensing device 606 determines the identity of first game piece 602 and may determine the current location of first game piece 602. Additionally, a user may indicate a type of engagement to initiate, as discussed herein.

In the example of FIG. 7, sensing device 606 determines an identity of second game piece 604 and may determine the current location of second game piece 604.

In the example of FIG. 8, multiple paths are possible between first game piece 602 and second game piece 604. As discussed herein, different paths may be followed based on obstacles or situations that require different types of movement of one or both game pieces 602, 604.

Figure 9:
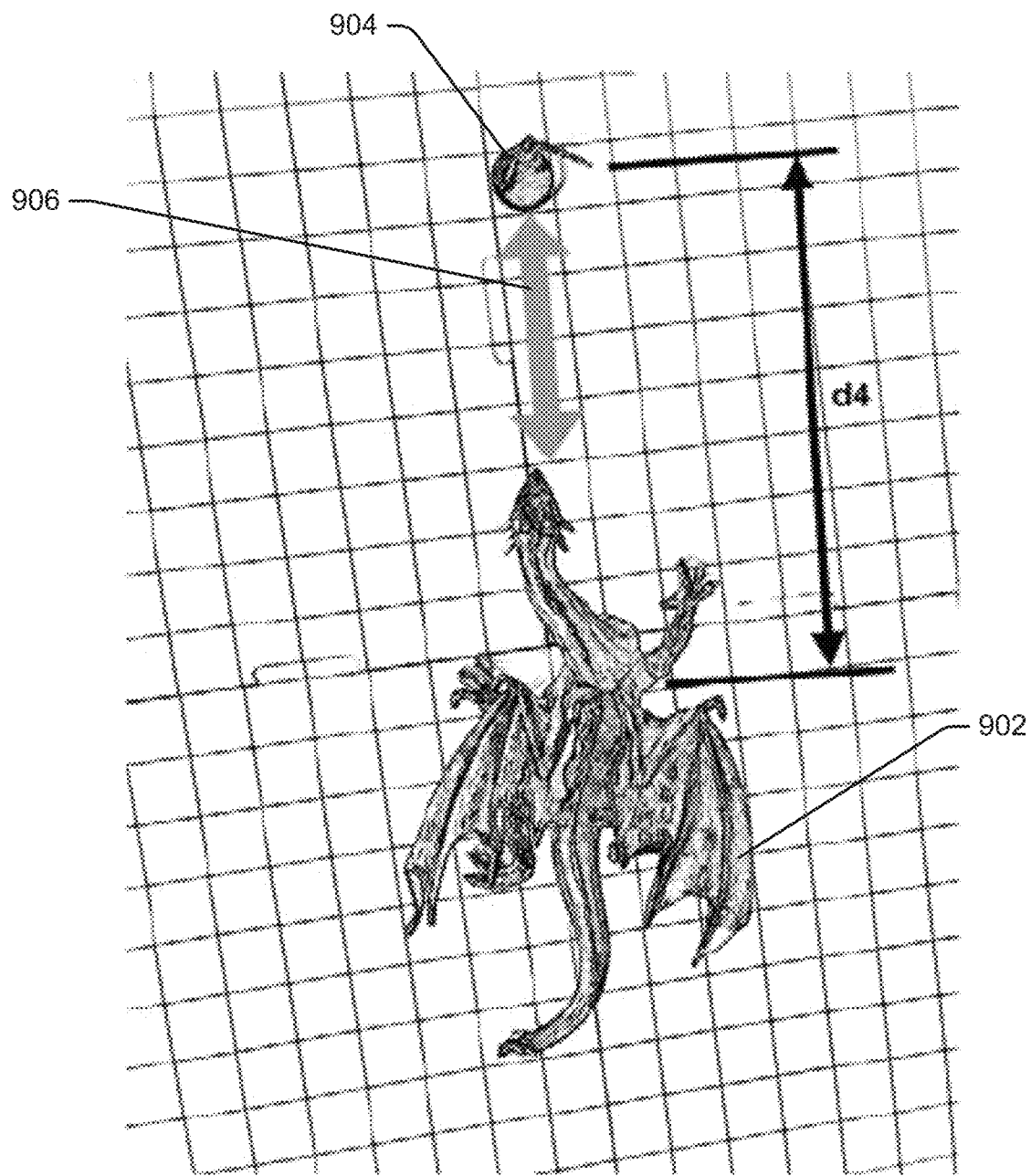
FIG. 9 illustrates an embodiment of measuring a distance between two game pieces on a game board having a grid.

FIG. 9 illustrates an embodiment of measuring a distance between two game pieces on a game board having a grid. The example of FIG. 9 shows a first game piece 902 and a second game piece 904 separated by a distance identified as "d4". The distance between game pieces 902 and 904 can be determined visually based on the grid pattern on the game board. An arrow 906 shows a movement of game pieces 902 and/or 904 towards one another. The grid pattern on the game board also supports determination of movement of game pieces 902 and/or 904 based on changes in position of each game piece relative to the grid pattern. For example, the position and movement of game pieces 902, 904 can be determined by a sensing device such as a camera or a mobile computing device having a camera. Alternately, the camera may be used to determine the range of movement or interactions for a game piece which could then be displayed to the player.

Figure 10:
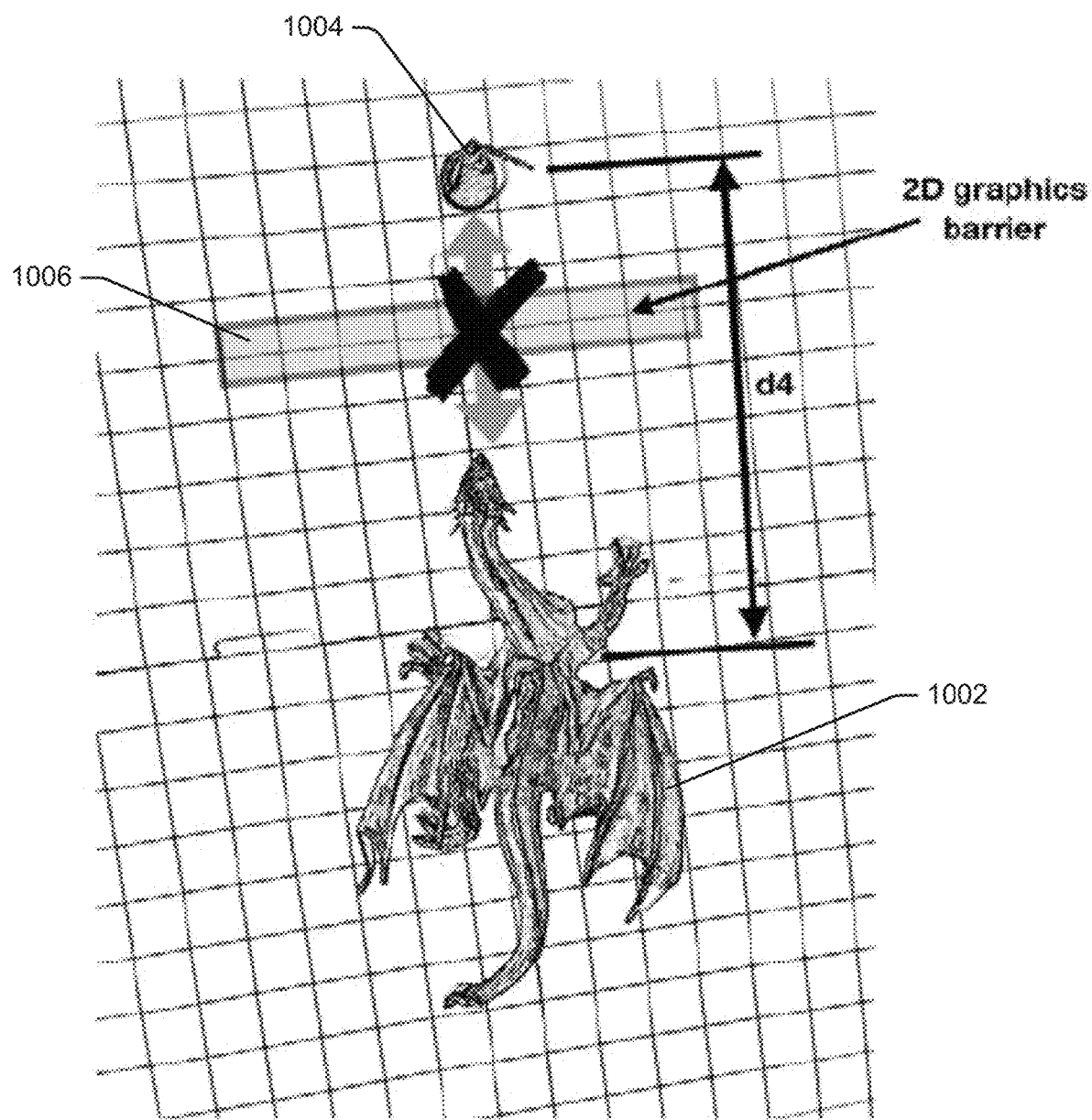
FIG. 10 illustrates an embodiment of detecting a barrier between two game pieces on a game board having a grid.

FIG. 10 illustrates an embodiment of detecting a barrier between two game pieces on a game board having a grid. The embodiment of FIG. 10 is similar to the example of FIG. 9, but has an added barrier. In particular, a first game piece 1002 and a second game piece 1004 are separated by a distance identified as "d4". The distance between game pieces 1002 and 1004 can be determined visually based on the grid pattern on the game board. A barrier 1006 is located between game pieces 1002 and 1004 which prevents or alters the interaction of the two game pieces. Although barrier 1006 may be a two-dimensional image on the game board, the two-dimensional image may represent a three-dimensional object that blocks movement of game pieces 1002 and 1004. As described herein, barrier 1006 may have various characteristics (e.g., location, height, width, depth, type of barrier, and the like) that are used to determine whether game pieces can move over or around the barrier. The barrier may be detected by any of the systems or methods discussed herein to identify game pieces (e.g., camera, RFID, etc.).

Figure 11:
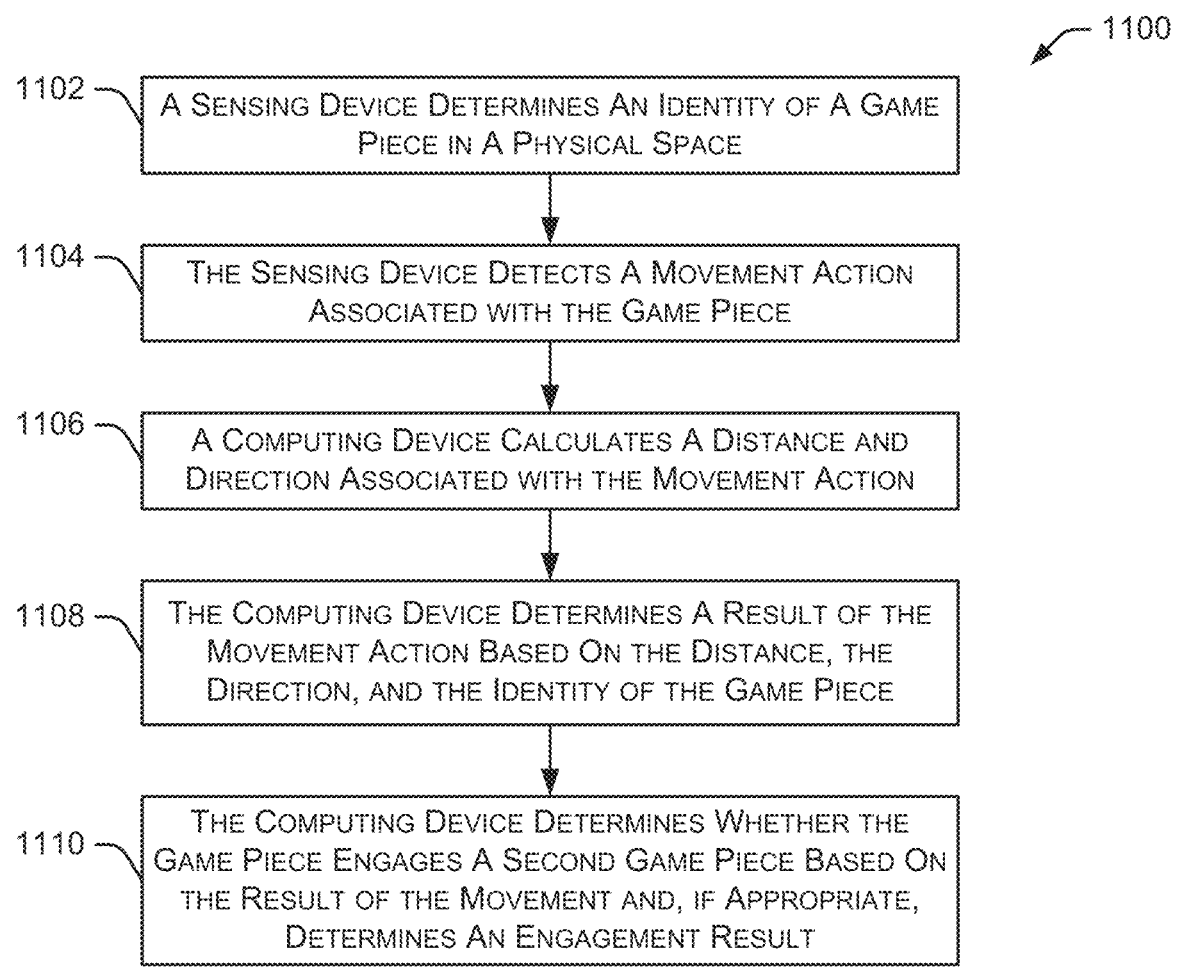
FIG. 11 illustrates an embodiment of a method for identifying game pieces and their movement within a physical space.

FIG. 11 illustrates an embodiment of a method 1100 for identifying game pieces and their movement within a physical space. Initially, a sensing device determines 1102 an identity of a game piece in a physical space. The sensing device further detects 1104 a movement action associated with the game piece. Method 1100 continues as a computing device calculates 1106 a distance and a direction associated with the movement action. The computing device then determines 1108 a result of the movement action based on the distance, the direction, and the identity of the game piece. In some embodiments, the computing device also determines 1110 whether the game piece engages a second game piece (in the physical space) based on the result of the movement. If the computing device determines that the game piece engages a second game piece, the computing device determines a result of the engagement.

In some embodiments, movement of a game piece (or other object) is simulated by moving a sensing device (such as a smart phone, mobile device, and the like) along a path of movement that the game piece follows. In particular implementations, the described systems and methods determine a distance that a game piece is moved by performing a double integration of the acceleration of the movement of a sensing device. The acceleration of the sensing device may be determined, for example, an IMU sensor or other component in the sensing device that can detect acceleration. Continuously integrating the acceleration over time produces a velocity of the sensing device. Then, continuously integrating the velocity over time produces a distance traveled by the sensing device (thereby simulating the distance traveled by the game piece being moved).

Figure 12:
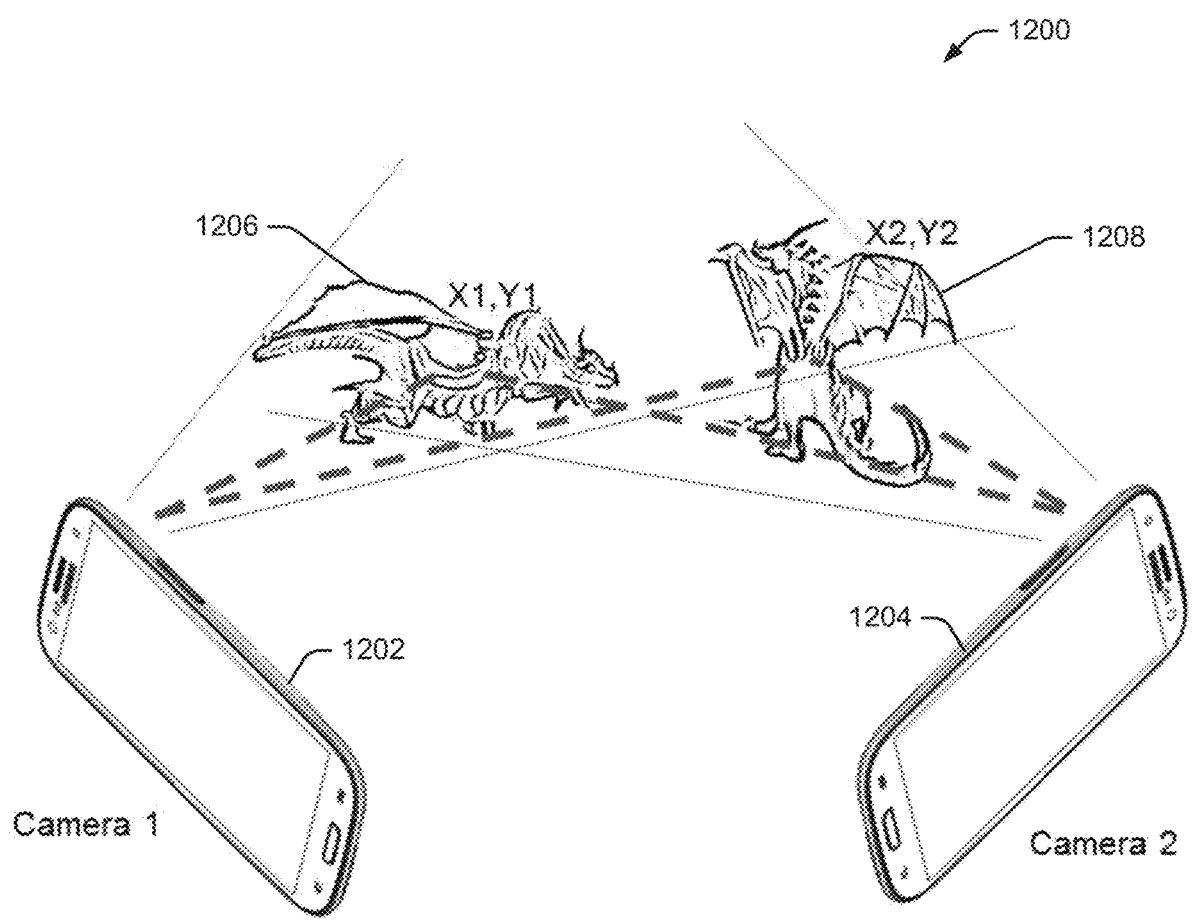
FIG. 12 illustrates an embodiment of a gaming environment with multiple cameras to capture multiple images from different perspectives.

In other embodiments, one or more cameras may be placed proximate the game environment to capture one or more images of the game environment from different perspectives. These one or more images are used to determine the movement of game pieces in the game environment and determine distances moved by the various game pieces. For example, FIG. 12 illustrates an embodiment of a gaming environment 1200 with multiple cameras 1202 and 1204 to capture multiple images from different perspectives. In this example, cameras 1202 and 1204 are located within a smartphone or mobile device. In other embodiments, any type of camera may be used to capture images. With two or more cameras, game pieces and other game elements can be identified with visual markers. The game pieces can be tracked and their relative location determined through triangulation as they move and interact within the game environment. A virtual copy of the location and movement information can be stored in memory. This embodiment provides new user interface opportunities, such as having a range of motion for individual game pieces displayed or allowing players to point between two game pieces they wish to have interact using computer vision.

Figure 13:
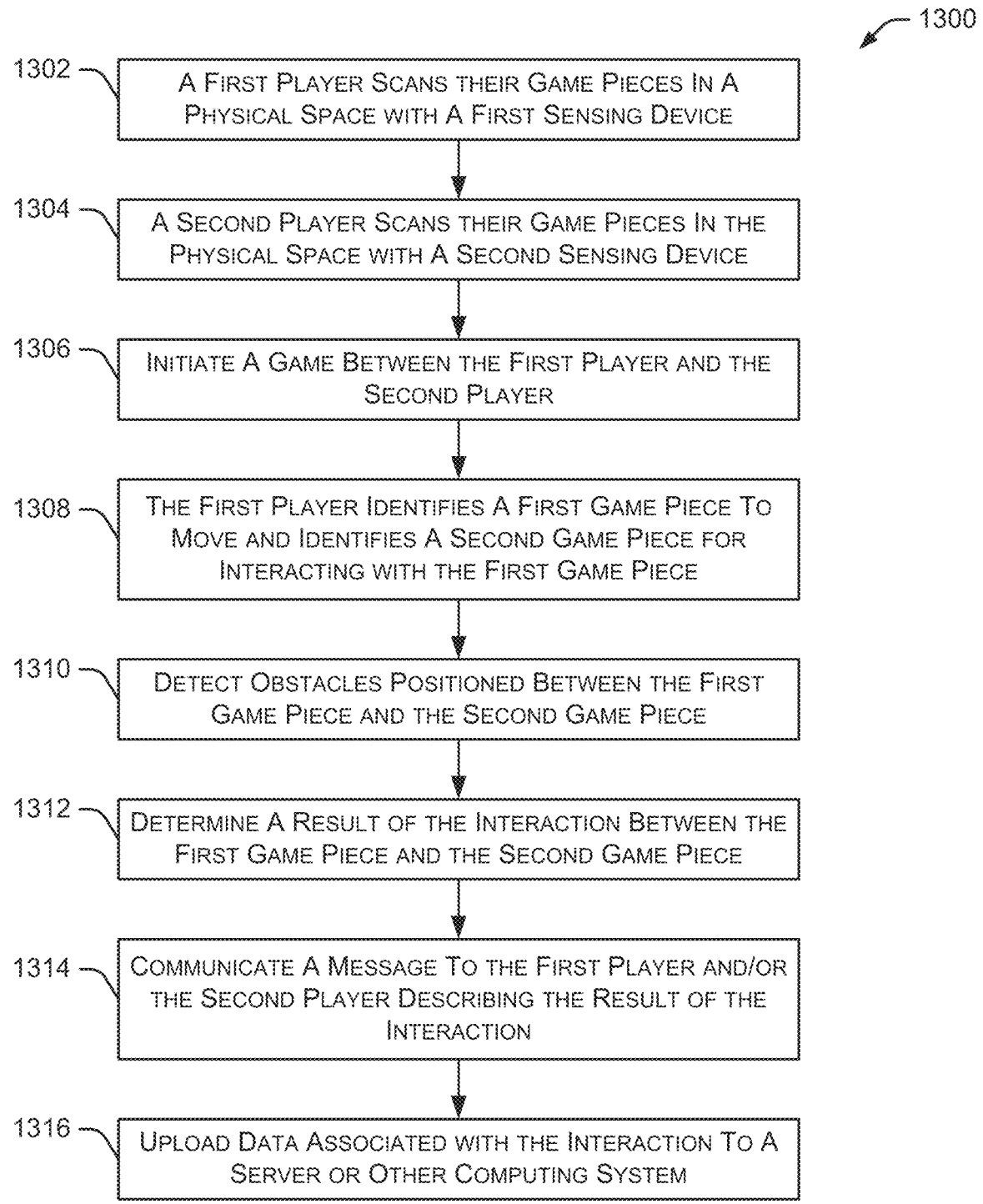
FIG. 13 illustrates an embodiment of a method for setting up and playing a game within a gaming environment.

FIG. 13 illustrates an embodiment of a method 1300 for setting up and playing a game within a gaming environment. The game set up process begins 1302 when a first player scans their game pieces in a physical space (also referred to as a gaming environment) with a first sensing device. For example, the first player may select a portion of all available game pieces for a particular game. The first player scans those selected game pieces to register them as being active in the particular game. Additionally, a second player scans 1304 their game pieces in the physical space with a second sensing device. As discussed herein, the first sensing device and second sensing device may be a mobile device (e.g., a smart phone or a tablet computing device), a camera, an RFID (Radio-Frequency Identification) sensor, an IMU (Inertial Measurement Unit), and the like capable of determining an identifier associated with each game piece. The sensing device may be executing an application that supports identification of particular games, game pieces, game activities, and the like. In some embodiments, the gaming environment may include a game board. Other embodiments are played in any environment that is not necessarily designed specifically for gaming activities. In some implementations, the first player and the second player use the same sensing device to scan their game pieces and perform other game-related activities, as discussed herein.

The game set up process may also include identifying terrain, obstacles, buildings, bridges, and the like that are active in a particular game. These game elements may also have identifiers (like the game pieces) that can be identified by a sensing device in the same manner as the game pieces.

After both players' game pieces are scanned, the game is initiated 1306 between the first player and the second player. This game initiation may include selection of a particular game, parameters of the game, rules of the game, and the like. As the game begins, a first player identifies 1308 a first game piece to move and identifies a second game piece (or other game element) for interacting with the first game piece. For example, the first game piece may attack the second game piece, transfer resources to the second game piece, receive resources from the second game piece, and the like. The first player may identify the first game piece by scanning the first game piece with the first sensing device, then physically moving the first sensing device to scan the second game piece. Based on scanning the first and second game pieces, the first sensing device determines the location of the first and second game pieces and determines a distance between the first and second game pieces. In some embodiments, the specific locations of the first and second game pieces are not determined. In these embodiments, method 1300 determines a location of one game piece with respect to the other game piece. Additionally, the first sensing device may detect 1310 obstacles positioned between the first game piece and the second game piece as the first sensing device is moved from the first game piece to the second game piece. These obstacles my include barriers to movement or elements that restrict certain gaming activities or interactions.

Method 1300 continues by determining 1312 a result of the interaction between the first game piece and the second game piece. For example, the result of the interaction may include damage to one or both game pieces, increased strength or other features for one or both game pieces, and the like. In some embodiments, the result of the interaction is determined by the first or second sensing device, another computing device, a remote server, and the like. In some situations, multiple devices may determine the result of the interaction and compare results to confirm the correct result. A message is communicated 1314 to the first player and/or the second player describing the result of the interaction between the first and second game pieces. The message may be communicated to the first sensing device, the second sensing device, or any other computing or sensing device. For example, the message may indicate damage inflicted to a particular game piece, a game piece is dead, a game piece is not available, and the like. Data associated with the interaction is uploaded 1316 to a server or other computing system for data backup, data sharing, and the like. Additionally, the uploaded data may be used to update game data such as the location and/or status of the game pieces.

In some embodiments, the sensing device, a mobile device, or a remote server maintains information associated with each game piece during the playing of a particular game. For example, the information maintained may include the location of each game piece, the status of each game piece, and the like.

Although the example of FIG. 13 discusses two players, alternate embodiments may include any number of players engaged in a networked game. In some embodiments, players may be arranged into teams where multiple players work together as a team to defeat other teams of players in a gaming environment. Additionally, in certain implementations a player (or team of players) may compete against a virtual player or virtual team implemented by a computing system.

As a particular game is played, various rules and other game activities are monitored by (and enforced by) the sensing device or other computing system. In some situations, the rules and other game activities are implemented using an application or algorithm implemented by the sensing device or other computing system. The rules and other game activities may be updated by making appropriate changes to the application or algorithm, and distributing those changes to all sensing devices and other computing systems.

In some embodiments, scanning game pieces (and other game elements) includes both identifying a particular game piece and determining an orientation of the particular game piece relative to another game piece or relative to another game element. Determining the orientation relative to another game piece may include identifying features of the game piece (e.g., features on the game piece itself (such as a character's face) or on the base of the game piece). In some embodiments, a front of a game piece may be a first color and the back of the same game piece may be a second color. As a sensing device is positioned near a game piece, the sensing device can identify colors of the game piece or information on the base of the game piece to determine the game piece's orientation.

Figure 14:
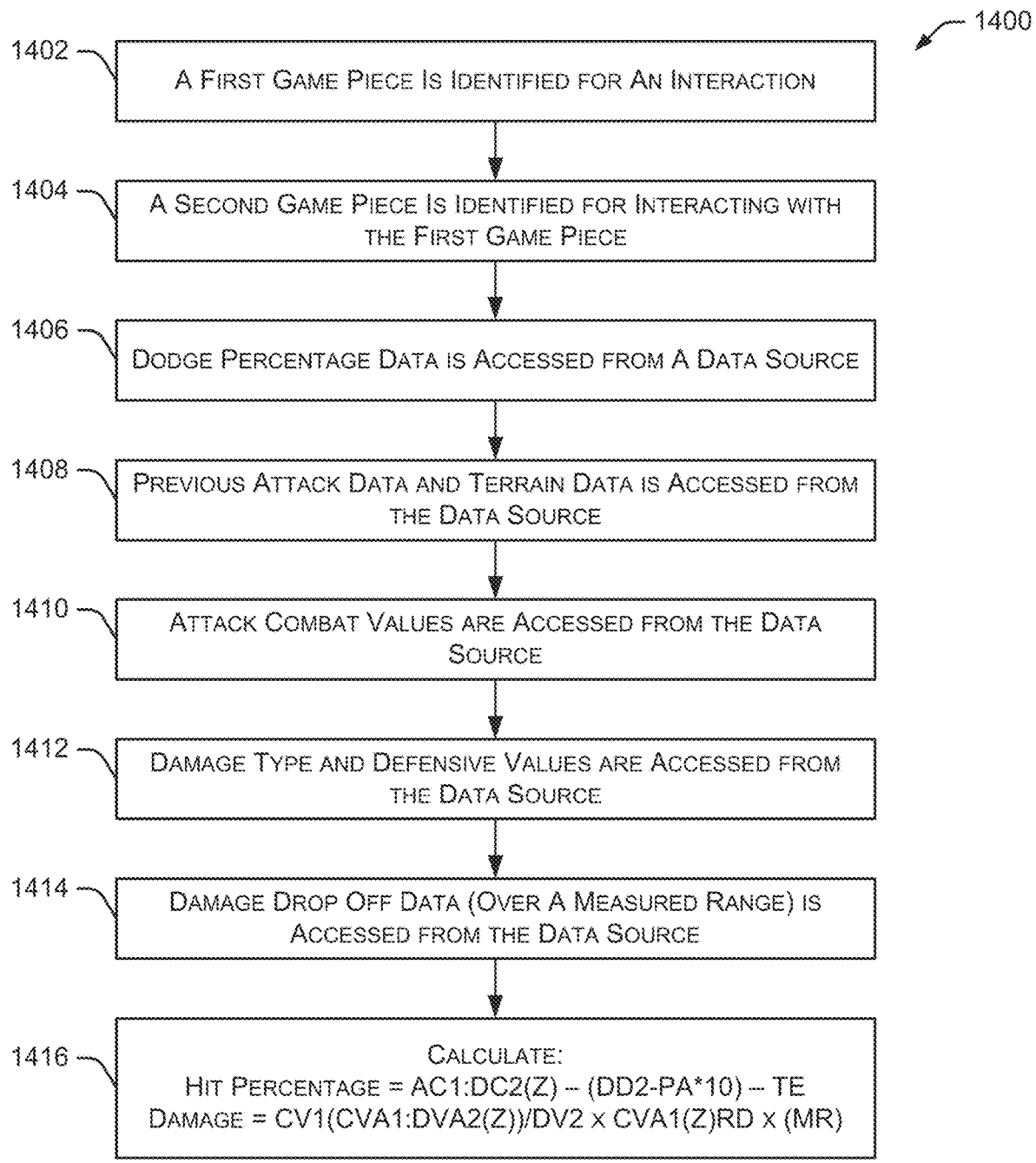
FIG. 14 illustrates an embodiment of a method for determining the results of an engagement between two game pieces.

FIG. 14 illustrates an embodiment of a method 1400 for determining the results of an engagement between two game pieces. Initially, a first game piece is identified 1402 for interaction. A second game piece is then identified 1404 for interacting with the first game piece. For example, the first and second game pieces may engage in a fight or other interaction. Method 1400 continues by accessing 1406 a dodge percentage from a data source. The data source may be any type of storage mechanism capable of storing any type of data. In some embodiments, the data source may store data in lookup tables or other data structures. Previous attack data and terrain data is accessed 1408 from the data source. Additionally, attack combat values are accessed 1410 from the data source. Method 1400 also accesses 1412 damage type and defensive values from the data source. Finally, damage drop off data (over a measured range) is accessed 1414 from the data source.

Method 1400 also calculates 1416 a hit percentage and a damage using the equations shown in FIG. 14. For example, the hit percentage may represent the likelihood of a weapon or other item hitting an intended target, such as a game piece or other game element. The damage may represent the amount of damage inflicted on the intended target. In the calculations 1416, AC1:DC2(A) represents the results from a lookup table of percentage of a hit for a selected attack X versus a target at the range determined between the first and second game pieces. DD2 represents an ability of a game piece to dodge an attack from another game piece. PA is the number of previous attacks a game piece has received in the current turn or episode of the game. For example, if a game piece has received several recent attacks, its ability to defend against another attack may be reduced. TE represents an increase or reduction in the accuracy of an attack based on the terrain. For example, a wooded area may reduce the accuracy of attack as compared to an open field.

As shown in FIG. 14, when calculating 1416 the damage, CV1 represents an attack combat value for a selected attack by a game piece. CVA1:DVA2(Z) represents the results from a lookup table for damage type of unit 1 (e.g., heat, kinetic, energy) versus a defensive value of the unit to determine effectiveness. DV2 is the total defensive value for unit 2. CVA1(Z)RD represents a percentage damage drop off of a selected attack over a range of distances. For example, some weapons inflict less damage as their distance from the target increases. MR is the measured range between the two game pieces involved in the interaction.

In alternate embodiments, the hit percentage and/or damage may be calculated using a random number generator.

Figure 15:
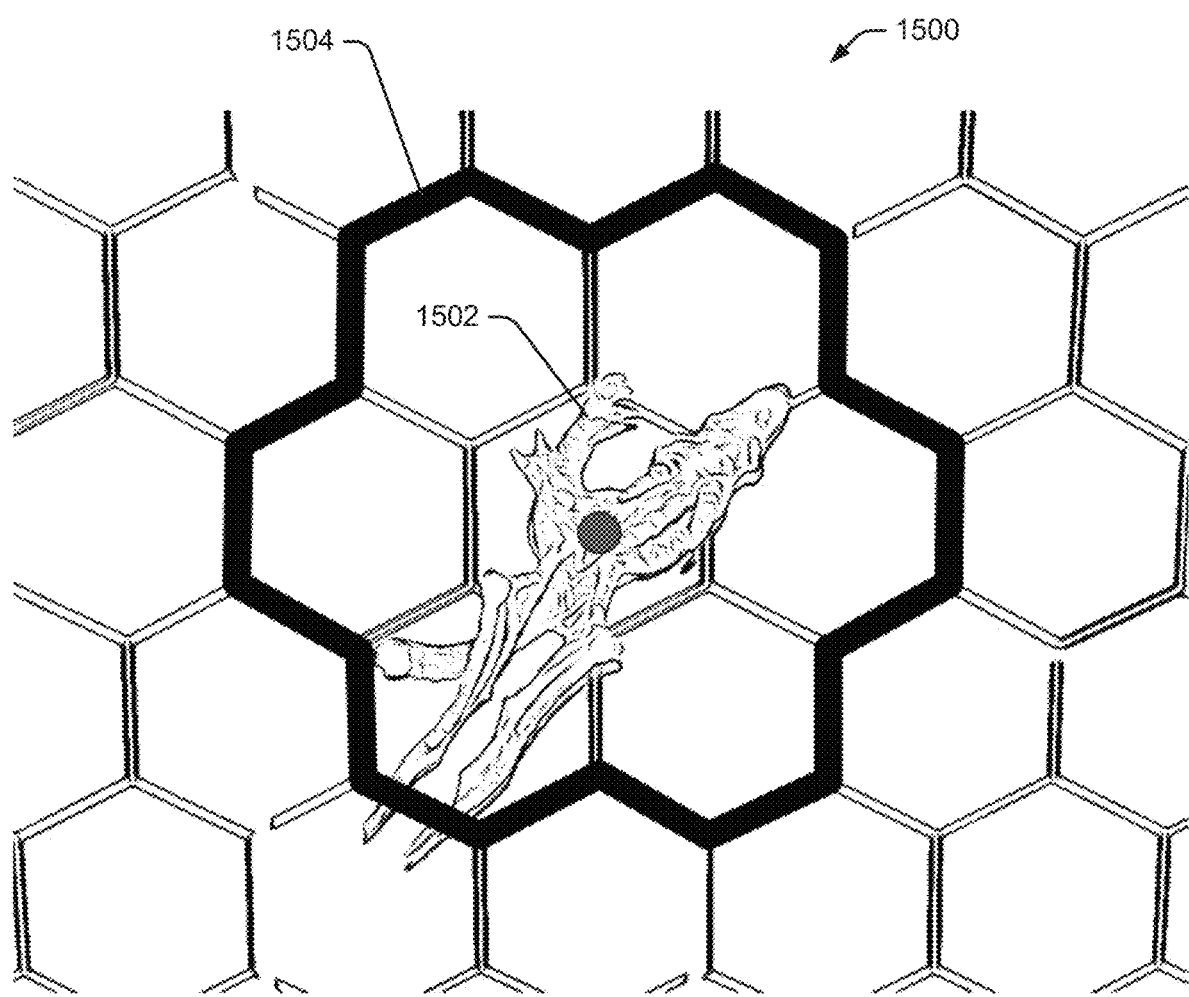
FIG. 15 illustrates an embodiment of a display showing a range of movement for a game piece.

FIG. 15 illustrates an embodiment of a display 1500 showing a range of movement 1504 for a game piece 1502. In this example, hexagons represent units of distance printed on a game map, or gaming surface, used for the purpose of determining movement and the range of interaction between game pieces. In alternate embodiments, these units could be represented as squares, or other printed shapes or patterns. Additionally, it is possible to project the distance of movement or interaction through a display as determined by a camera based on distance from the game surface.

The described systems and methods are illustrated herein with reference to a game environment. However, the systems and methods discussed herein may be applied in any type of environment or system. For example, the systems and methods are useful in education, instruction, and safety. In some embodiments, a scientist or science student can quickly identify combinations of chemicals or other ingredients that may be hazardous when combined together. Other embodiments may provide specific instructions on how to safely combine ingredients or achieve a particular affect through rules that are captured in a software application. In some implementations, the systems and methods are applied in a cooking or baking environment in which directions are provided for selecting recipes based on existing ingredients. Additionally, directions may be provided on how to select ingredients, steps to prepare with each ingredient (e.g., mixing, shredding, and slicing), and the like.

In particular embodiments, students may interact with different pieces, components, or physical representations that are uniquely identifiable visually or that have an identifying piece of electronics (e.g., RFID or BLE Beacon) embedded in them to determine the effect of interactions between them. For example, a student may learn what would happen when specific pieces of DNA are combined or when different plants are hybridized with each other. A software application can show the results of the experiment or interaction.

The described systems and methods are also useful for safety applications to ensure that chemicals or items that are dangerous in proximity to each other are maintained at a safe distance. Using the IMU or camera as a visual measuring device, the chemicals' proximity to each other could be established and safety rules displayed. In some embodiments, sensors in a mobile device that are useful in establishing safe storage could include a built-in temperature sensor to monitor temperatures especially related to chemicals that are volatile in specific temperature ranges.

Additionally, the systems and methods described herein are useful in situations where complex interaction between items can be crucial to the outcome of a particular assembly. For example, the systems and methods may uniquely identify parts that are being assembled (e.g., visually or via RFID) and determine how the parts interact with each other via a software application executing on a mobile device. This may accelerate the assembly process and help avoid incorrect assembly of parts. In some embodiments, the systems and methods can optimize a manufacturing line or assembly process where the proximity of components and tools (and how they fit together) is critical. By identifying the distance and interaction between each element of the assembly process, optimal configuration of the assembly line is established by placing the items and using the software system to determine optimal placement of items relative to each other based on the assembly time, which tools and items are used together, and the like.

In another environment, the systems and methods described herein may resolve sound patterns for one or more speakers being positioned in a room. For example, a mobile device may be used to identify an initial location of one or more speakers using RFID, visual indicators, and the like. An application executing on the mobile device may provide advice on where to position additional speakers, based on a listener sitting position, for optimal sound quality by modeling the acoustic signature of each speaker. Alternate embodiments may use a similar technique for microphone placement and the like.

Figure 16:
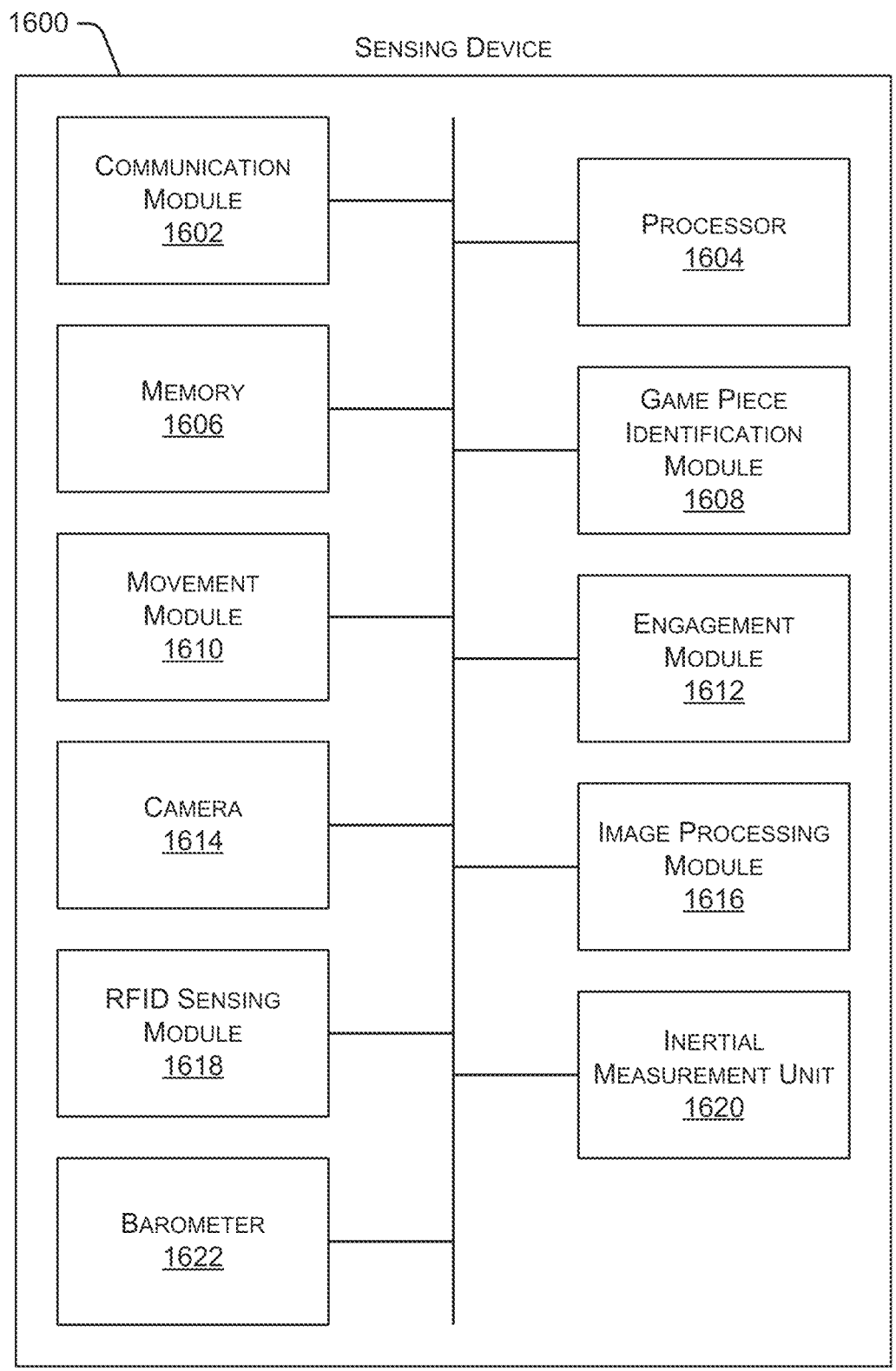
FIG. 16 illustrates an embodiment of a sensing device.

FIG. 16 illustrates an embodiment of a sensing device 1600. As shown in FIG. 16, sensing device 1600 includes a communication module 1602, a processor 1604, and a memory 1606. Communication module 1602 allows sensing device 1600 to communicate with other systems, such as other sensing devices, computing devices, and the like. For example, communication module 1602 may communicate with other sensing devices involved in a particular game and may communicate with one or more computing systems that perform various calculations associated with the game.

Processor 1604 executes various instructions to implement the functionality provided by sensing device 1600, as discussed herein. Memory 1606 stores these instructions as well as other data used by processor 1604 and other modules and components contained in sensing device 1600.

Additionally, sensing device 1600 includes a game piece identification module 1608 that identifies a type of game piece (or other game element) and, in some embodiments, a specific game piece that has a unique identifier. As discussed herein, a game piece may be identified using an RFID code, visual codes, and the like. A movement module 1610 determines movement of a game piece based on movement of sensing device 1600 or by analyzing data (e.g., camera images) containing information associated with game piece movement. An engagement module 1612 determines a result of an engagement (or interaction) between two or more game pieces, such as a battle or other interaction during a game. In some embodiments, engagement module 1612 communicates with other devices, such as computing devices, via communication module 1602. These other devices may perform all (or a portion) of the calculations necessary to determine the results of an engagement and communicate the results to engagement module 1612 via communication module 1602.

Sensing device 1600 also includes a camera 1614 and an image processing module 1616. Camera 1614 may capture images of game pieces, game elements, and a gaming environment to identify game pieces, identify game elements, and calculate distances between game pieces. The images captured by camera 1614 are also useful to determine locations of game pieces and other game elements within the gaming environment. Image processing module 1616 analyzes the captured images to identify game pieces, calculate distances, and determine locations of game pieces within the gaming environment.

Sensing device 1600 further includes an RFID sensing module 1618 that detects RFID signals from game pieces or other game elements in a gaming environment. As discussed herein, the RFID signals may be used to identify a type of game piece or a specific game piece in a gaming environment. An inertial measurement unit 1620 detects movement and forces associated with sensing device 1600, as discussed herein. A barometer 1622 is useful for determining an altitude or altitude changes. In sensing device 1600, barometer 1622 can determine height changes of sensing device 1600 (e.g., changes in height relative to a surface in a gaming environment). In some embodiments, barometer 1622 can determine changes in height of sensing device 1600 as the device simulates movement of a game piece or other game element.

Figure 17:
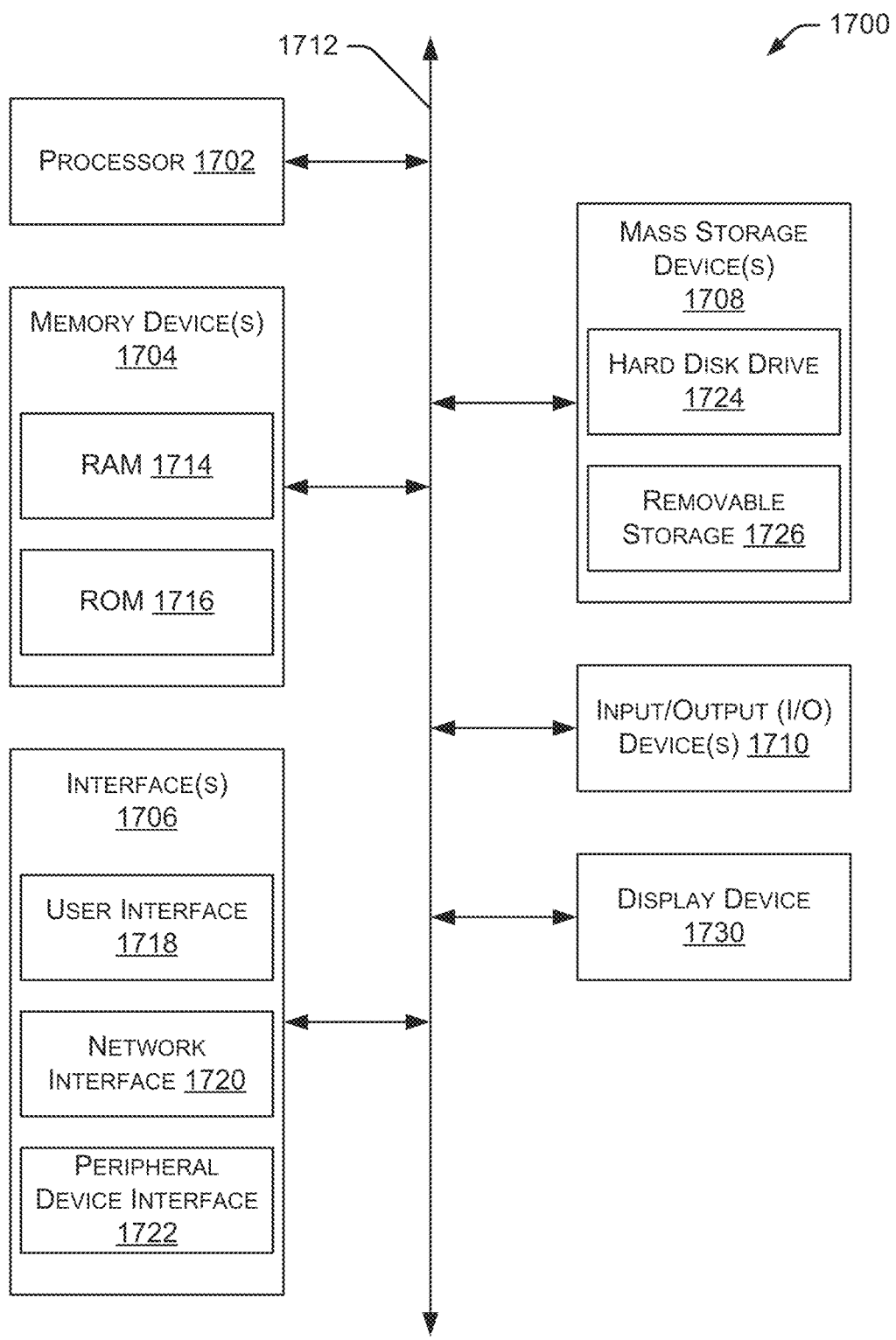
FIG. 17 illustrates an example block diagram of a computing device.

FIG. 17 illustrates an example block diagram of a computing device 1700. Computing device 1700 may be used to perform various procedures, such as those discussed herein. For example, computing device 1700 may perform any of the functions or methods of the computing devices described herein, the sensing devices described herein, and/or any other computing entity. Computing device 1700 can perform various functions as discussed herein, and can execute one or more application programs, such as the application programs or functionality described herein. Computing device 1700 can be any of a wide variety of computing devices, such as a desktop computer, a notebook computer, a server computer, a handheld computer, tablet computer, a wearable device, a smartphone, and the like.

Computing device 1700 includes one or more processor(s) 1702, one or more memory device(s) 1704, one or more interface(s) 1706, one or more mass storage device(s) 1708, one or more Input/Output (I/O) device(s) 1710, and a display device 1730 all of which are coupled to a bus 1712. Processor(s) 1702 include one or more processors or controllers that execute instructions stored in memory device(s) 1704 and/or mass storage device(s) 1708. Processor(s) 1702 may also include various types of computer-readable media, such as cache memory.

Memory device(s) 1704 include various computer-readable media, such as volatile memory (e.g., random access memory (RAM) 1714) and/or nonvolatile memory (e.g., read-only memory (ROM) 1716). Memory device(s) 1704 may also include rewritable ROM, such as Flash memory.

Mass storage device(s) 1708 include various computer readable media, such as magnetic tapes, magnetic disks, optical disks, solid-state memory (e.g., Flash memory), and so forth. As shown in FIG. 17, a particular mass storage device is a hard disk drive 1724. Various drives may also be included in mass storage device(s) 1708 to enable reading from and/or writing to the various computer readable media. Mass storage device(s) 1708 include removable media 1726 and/or non-removable media.

I/O device(s) 1710 include various devices that allow data and/or other information to be input to or retrieved from computing device 1700. Example I/O device(s) 1710 include cursor control devices, keyboards, keypads, microphones, monitors or other display devices, speakers, printers, network interface cards, modems, and the like.

Display device 1730 includes any type of device capable of displaying information to one or more users of computing device 1700. Examples of display device 1730 include a monitor, display terminal, video projection device, and the like.

Interface(s) 1706 include various interfaces that allow computing device 1700 to interact with other systems, devices, or computing environments. Example interface(s) 1706 may include any number of different network interfaces 1720, such as interfaces to local area networks (LANs), wide area networks (WANs), wireless networks, and the Internet. Other interface(s) include user interface 1718 and peripheral device interface 1722. The interface(s) 1706 may also include one or more user interface elements 1718. The interface(s) 1706 may also include one or more peripheral interfaces such as interfaces for printers, pointing devices (mice, track pad, or any suitable user interface now known to those of ordinary skill in the field, or later discovered), keyboards, and the like.

Bus 1712 allows processor(s) 1702, memory device(s) 1704, interface(s) 1706, mass storage device(s) 1708, and I/O device(s) 1710 to communicate with one another, as well as other devices or components coupled to bus 1712. Bus 1712 represents one or more of several types of bus structures, such as a system bus, PCI bus, IEEE bus, USB bus, and so forth.

For purposes of illustration, programs and other executable program components are shown herein as discrete blocks, although it is understood that such programs and components may reside at various times in different storage components of computing device 1700, and are executed by processor(s) 1702. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

While various embodiments of the present disclosure are described herein, it should be understood that they are presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the described exemplary embodiments, but should be defined only in accordance with the following claims and their equivalents. The description herein is presented for the purposes of illustration and description. It is not intended to be exhaustive or to limit the disclosure to the precise form disclosed. Many modifications and variations are possible in light of the disclosed teaching. Further, it should be noted that any or all of the alternate implementations discussed herein may be used in any combination desired to form additional hybrid implementations of the disclosure.

The invention claimed is:

1. A method comprising:
   detecting, by a sensing device, a movement action associated with a game piece in a physical space by detecting a movement of the sensing device;
   calculating, by a computing device, a distance and direction associated with the movement action; and
   determining, by the computing device, a result of the movement action based on the distance, the direction, and the identity of the game piece.

2. The method of claim 1, wherein the game piece engages with a second game piece in the physical space.

3. The method of claim 1, wherein the movement action includes at least one of a horizontal movement of the game piece, a vertical movement of the game piece, or a combination of a horizontal and vertical movement of the game piece.

4. The method of claim 1, wherein the movement action is defined by moving the sensing device along a proposed path of the game piece.

5. The method of claim 1, further comprising:
   communicating the result of the movement action to a second computing device in the physical space.

6. The method of claim 5, wherein the second computing device is associated with a second game piece in the physical space.

7. The method of claim 1, further comprising:
   communicating the result of the movement action to a remote computing system located outside the physical space.

8. The method of claim 1, wherein determining the identity of the game piece includes at least one of determining an RFID (Radio-Frequency Identification) associated with the game piece, capturing an image of the game piece, identifying a Bluetooth low energy beacon associated with the game piece, identifying a pulsed light pattern emitted by the game piece, or analyzing a visual code associated with the game piece.

9. The method of claim 1, further comprising:
   determining, by the computing device, whether any obstacles are present along a movement path of the game piece.

10. The method of claim 1, wherein the sensing device is at least one of a mobile computing device, a camera, an RFID (Radio-Frequency Identification) sensor, or an IMU (Inertial Measurement Unit).

11. The method of claim 1, wherein the sensing device is incorporated into the computing device.

12. The method of claim 1, wherein the sensing device is associated with the game piece.

13. An apparatus comprising:
   a sensing device configured to detect movement of a first game piece or a second game piece in a physical space by detecting a movement of the sensing device, the sensing device further configured to calculate a distance and direction associated with the movement action; and
   a computing device configured to determine a result of an interaction between the first game piece and the second game piece based on the distance, the direction, an identity of the first game piece, and an identity of the second game piece.

14. The apparatus of claim 13, wherein the sensing device determines the identity of the first game piece by performing at least one of determining an RFID (Radio-Frequency Identification) associated with the game piece, capturing an image of the game piece, identifying a Bluetooth low energy beacon associated with the game piece, identifying a pulsed light pattern emitted by the game piece, or analyzing a visual code associated with the game piece.

15. The apparatus of claim 13, wherein the sensing device is at least one of a mobile computing device, a camera, an RFID (Radio-Frequency Identification) sensor, or an IMU (Inertial Measurement Unit).

16. The apparatus of claim 13, further comprising:
   a communication module configured to communicate the result of the interaction to a remote computing system located outside the physical space.

17. The apparatus of claim 13, wherein the sensing device is further configured to detect a movement action associated with the first game piece or the second game piece.

18. A method comprising:
   identifying an interaction between a first game piece and a second game piece in a physical space by detecting a movement action of at least one of the first game piece and the second game piece based on a movement of a sensing device;
   calculating, by a computing device, a result of the interaction between the first game piece and the second game piece; and
   updating, by the computing device, game data associated with the first game piece and the second game piece based on the result of the interaction.

19. The method of claim 18, further comprising:
   communicating the result of the interaction to a second computing device in the physical space.

20. The method of claim 18, wherein the sensing device is at least one of a mobile computing device, a camera, an RFID (Radio-Frequency Identification) sensor, or an IMU (Inertial Measurement Unit).

* * * * *